(12) United States Patent
Lin et al.

(10) Patent No.: US 9,186,959 B2
(45) Date of Patent: Nov. 17, 2015

(54) SUNSHADE ASSEMBLY

(71) Applicant: MACAUTO INDUSTRIAL CO., LTD., Tainan (TW)

(72) Inventors: Paul Lin, Tainan (TW); Chi-Tsai Fang, Tainan (TW)

(73) Assignee: MACAUTO INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 14/335,714

(22) Filed: Jul. 18, 2014

(65) Prior Publication Data
US 2015/0027646 A1    Jan. 29, 2015

(30) Foreign Application Priority Data

Jul. 23, 2013    (TW) .............................. 102126280 A

(51) Int. Cl.
*B60J 1/08* (2006.01)
*B60J 1/12* (2006.01)
*B60J 1/20* (2006.01)

(52) U.S. Cl.
CPC ........ *B60J 1/12* (2013.01); *B60J 1/2019* (2013.01); *B60J 1/2044* (2013.01); *B60J 1/2086* (2013.01)

(58) Field of Classification Search
USPC .......... 160/370.22, 84.04, 178.1 R, 340, 265, 160/22, 66

IPC ... B60J 1/2044,1/2022, 1/2083; E06B 9/17046; E04F 10/0692
See application file for complete search history.

(56) References Cited

U.S. PATENT DOCUMENTS

| | | | |
|---|---|---|---|
| 6,848,493 B1 * | 2/2005 | Hansen et al. | 160/370.22 |
| 7,793,701 B2 * | 9/2010 | Liang et al. | 160/178.1 R |
| 7,896,058 B2 * | 3/2011 | Hansen | 160/370.22 |
| 8,033,313 B2 * | 10/2011 | Hansen | 160/370.22 |
| 2007/0084567 A1 * | 4/2007 | Chen | 160/84.05 |
| 2008/0017335 A1 * | 1/2008 | Pohl et al. | 160/370.22 |
| 2008/0216972 A1 * | 9/2008 | Starzmann et al. | 160/310 |
| 2012/0160429 A1 * | 6/2012 | Lin | 160/291 |
| 2012/0186758 A1 * | 7/2012 | Katada | 160/370.21 |

\* cited by examiner

*Primary Examiner* — David Purol
(74) *Attorney, Agent, or Firm* — Muncy, Geissler, Olds & Lowe, P.C.

(57) ABSTRACT

A sunshade assembly for installation on a window frame includes a curtain, a bar connected to the curtain, a pivot connection member disposed inside the bar, an abutment member disposed inside the pivot connection member, a transmission rod extending into the pivot connection member to engage the abutment member, and a drive unit driving the transmission rod to move. When the drive unit drives the transmission rod to move upward, the transmission rod pushes upward the abutment member to move upward the bar and to thereby stretch the curtain. When the bar abuts against the window frame, the transmission rod is not deformed.

8 Claims, 6 Drawing Sheets

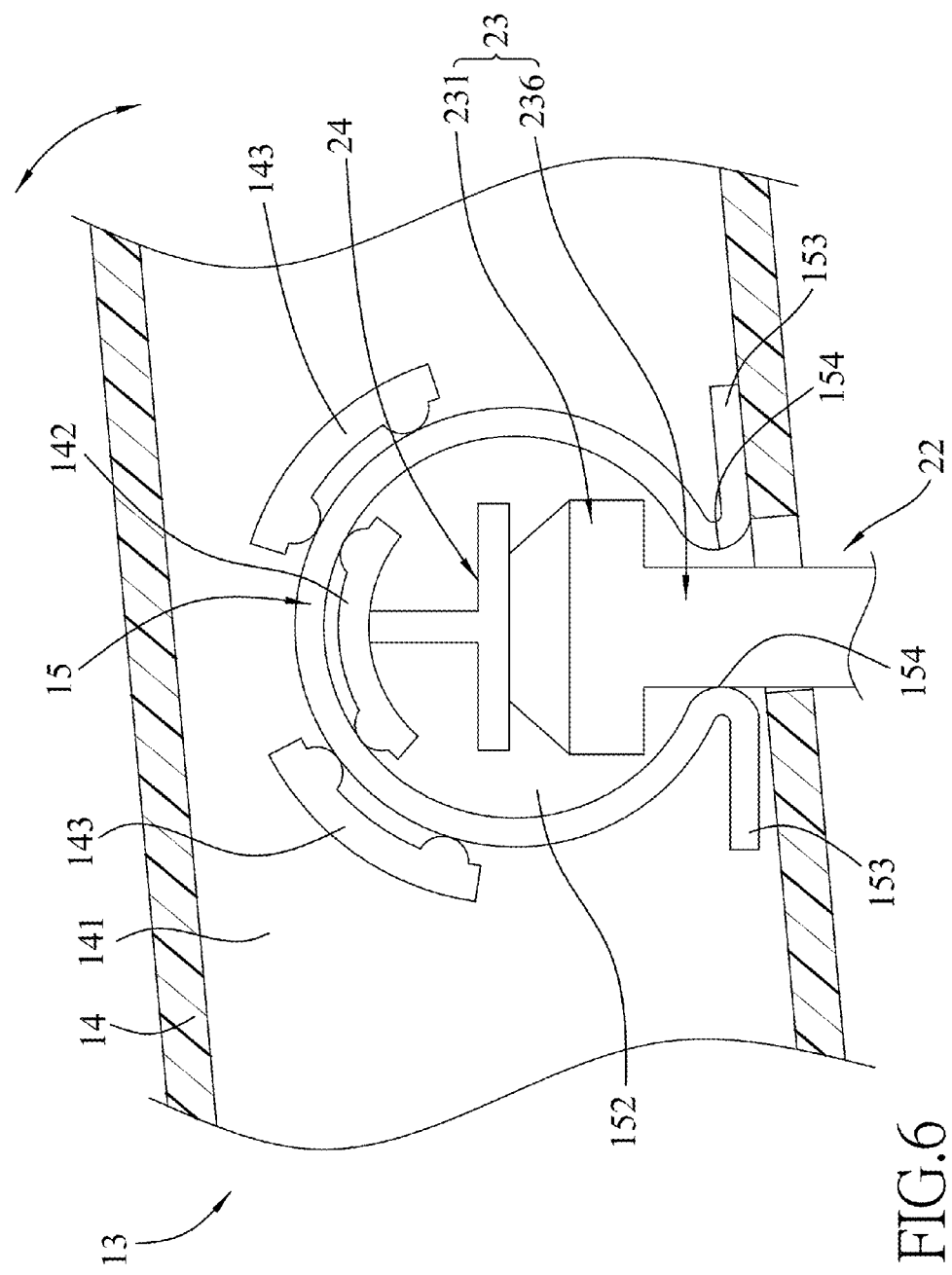

SUNSHADE ASSEMBLY

CROSS-REFERENCE TO RELATED APPLICATION

This application claims priority of Taiwanese Application No. 102126280, filed on Jul. 23, 2013.

FIELD OF THE INVENTION

The invention relates to a sunshade assembly, more particularly to a sunshade assembly having a pivot connection member and an abutment member to prevent a transmission rod coupled to a sunshade curtain from being deformed upon the sunshade assembly abutting against a window frame.

BACKGROUND OF THE INVENTION

As shown in FIG. 1, a conventional sunshade assembly is generally disposed inside of a vehicle door 9. The vehicle door 9 has a window frame 91 and a vehicle window 900 mounted to and movable relative to the window frame 91. The window frame 91 has a top portion 911 over the vehicle window 900. The conventional sunshade assembly can cover an opening defined by the window frame 91, and includes a sunshade mechanism 81 and a control mechanism 82 connected to the sunshade mechanism 81.

The sunshade mechanism 81 includes a casing 811 with an opening 810, a curtain 812 disposed in the casing 811 in a windable manner, and a rod member 813 mounted on an end portion of the curtain 812 and exposed outside of the opening 810. The control mechanism 82 includes a drive unit 821 disposed in proximity to the casing 811, and a transmission rod 822 driven by the drive unit 821 so to be movable relative to the drive unit 821. The transmission rod 822 is vertically fixed to the rod member 813. The drive unit 821 may be an electrical motor or a resilient mechanical member that is capable of storing a resilient force and driving upward and downward movements of the transmission rod 822.

In actual use, the transmission rod 822 is driven to be moved together with the rod member 813, such that the curtain 812 is moved together with the rod member 813 between an extended state and a retracted state. When driven to reach the top portion 911 of the window frame 91, the rod member 813 will abut against the top portion 911 in an oblique manner since the top portion 911 generally has an oblique configuration. Besides, since the rod member 813 and the transmission rod 822 are fixedly connected to each other, the transmission rod 822 is forced to be deformed so as to make the rod member 813 conformably abut against the top portion 911.

Therefore, in order to cover the opening defined by the window frame 91, the drive unit 821 tends to be loaded excessively so as to compensate for resistance resulting from an oblique movement of the rod member 813. The service life of the drive unit 821 is thus shortened. Additionally, repetitive deformation of the transmission rod 822 also tends to shorten the service life thereof. Hence, the service life of the entire conventional sunshade assembly is reduced.

SUMMARY OF THE INVENTION

Therefore, an object of the present invention is to provide a sunshade assembly that can overcome the aforesaid drawback of the prior art.

According to the present invention, a sunshade assembly for installation on a window frame includes a sunshade mechanism and a stretching mechanism connected to the sunshade mechanism.

The sunshade mechanism includes a casing, a curtain and a bar unit. The casing has a top opening. The curtain is disposed in the casing in a resiliently windable manner, and has an end portion exposed out of the top opening. The bar unit is connected to the curtain, and has a bar and a pivot connection member. The bar is mounted on the end portion of the curtain. The pivot connection member is disposed in the bar and has an accommodating space.

The stretching mechanism includes a drive unit and a transmission unit. The drive unit is disposed below the casing. The transmission unit is connected to the drive unit. The transmission unit has a transmission rod and an abutment member. The transmission rod is driven by the drive unit to move upward or downward and is connected to the bar unit. The abutment member is received in the accommodating space and is surrounded by the pivot connection member. The transmission rod has a head portion that extends movably into the accommodating space to abut against the abutment member and a rod portion that engages the pivot connection member.

When the drive unit drives the transmission rod to move upward, the head portion pushes upward the abutment member to move upward the bar and to thereby stretch the curtain.

The bar is pivotally movable relative to the transmission rod and about the pivot connection member so that the transmission rod is not bent when the bar abuts against a top of the window frame.

When the drive unit drives the transmission rod to move downward, the head portion brings the bar to move downward so that the curtain is wound up.

BRIEF DESCRIPTION OF THE DRAWINGS

Other features and advantages of the present invention will become apparent in the following detailed description of the embodiment with reference to the accompanying drawings, of which:

FIG. 6 is a schematic view similar to FIG. 3, illustrating the structural arrangement of the bar unit and the transmission unit of the embodiment when the curtain is in the wound up state.

DETAILED DESCRIPTION OF THE PREFERRED EMBODIMENT

Figure 1:
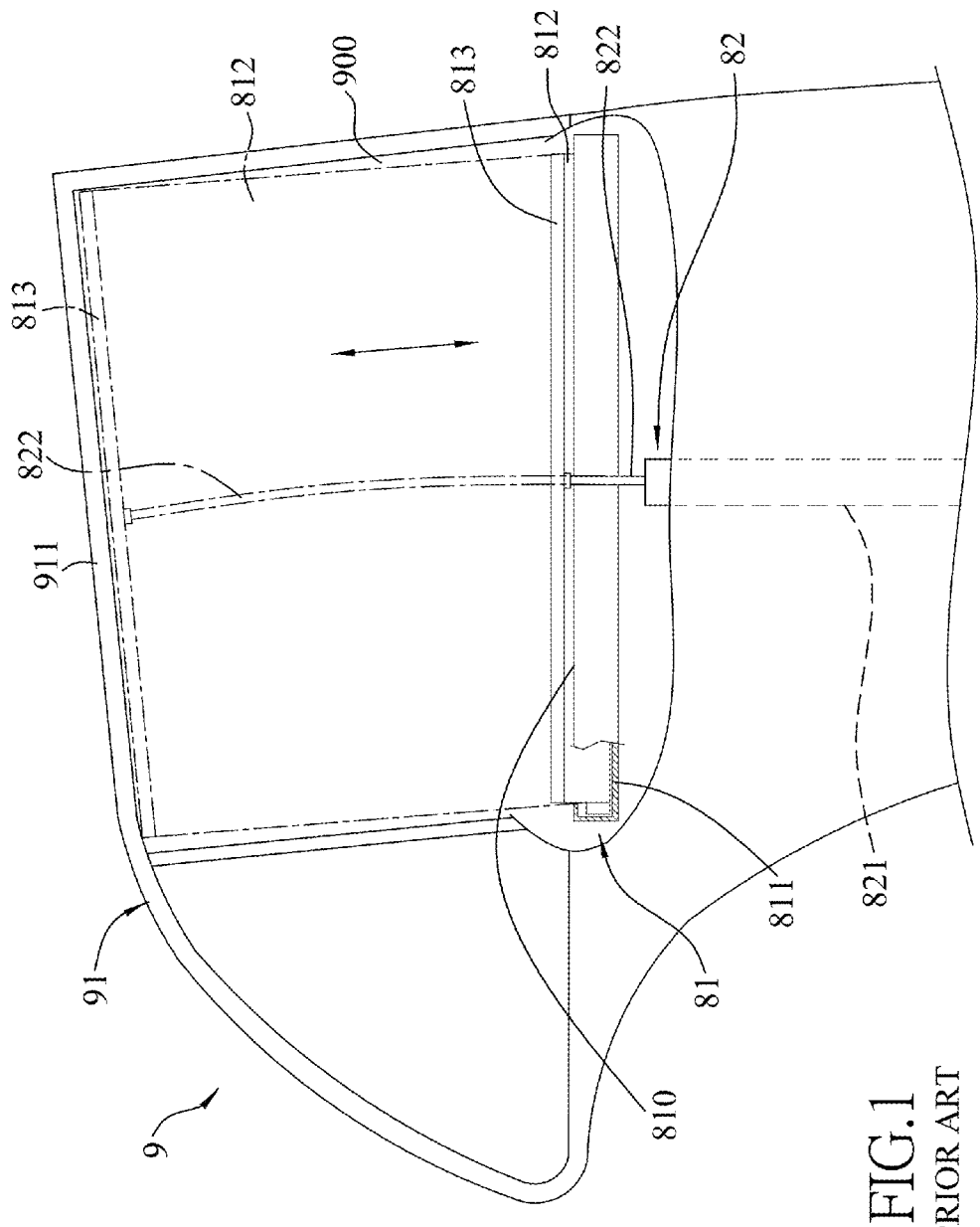
FIG. 1 is a schematic view of a conventional sunshade assembly installed on a window frame of a vehicle door.
Figure 2:
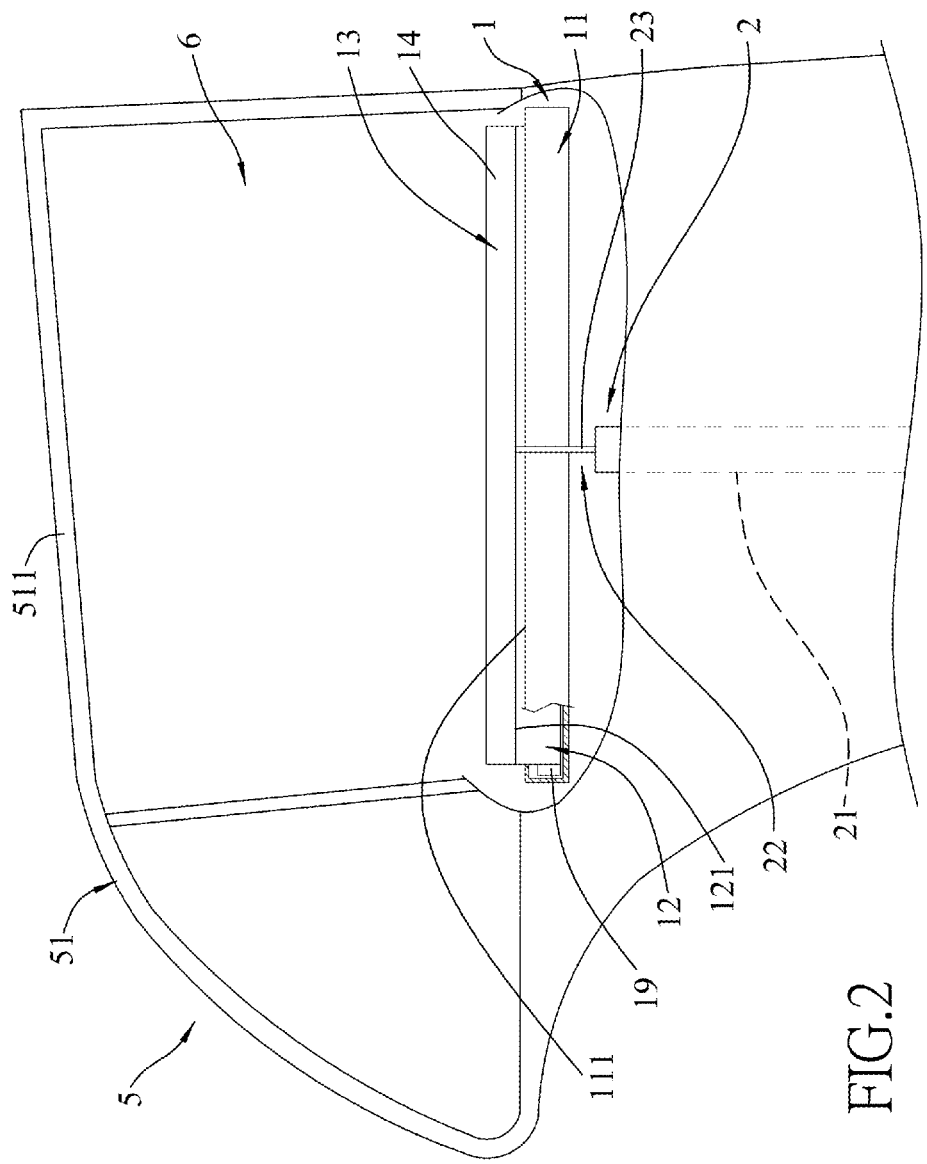
FIG. 2 is a schematic view of the embodiment of a sunshade assembly according to the present invention installed on a window frame of a vehicle door when a curtain of the sunshade assembly is in a wound up state.
Figure 3:
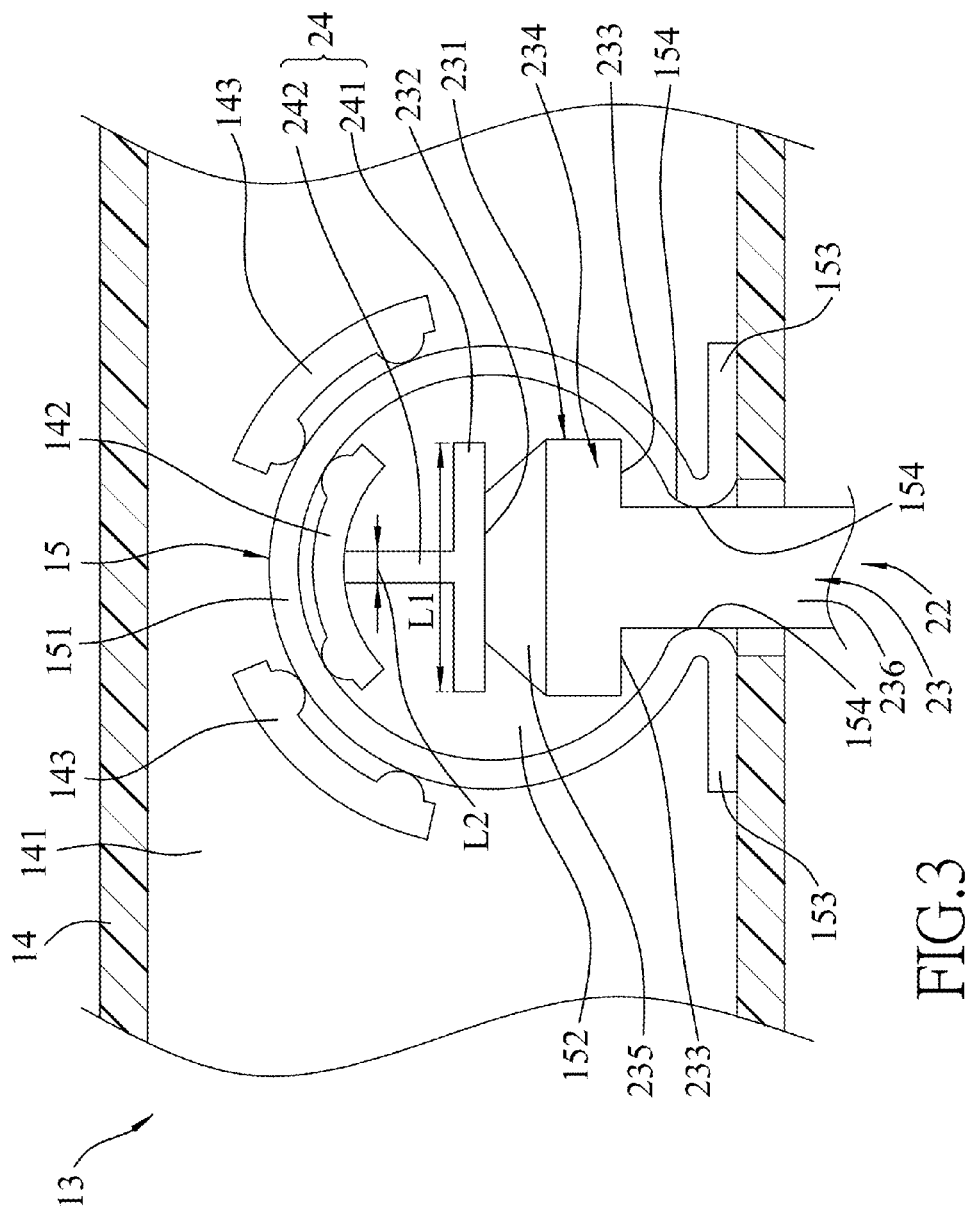
FIG. 3 is a fragmentary, partly-sectional view illustrating structural arrangement of a bar unit and a transmission unit of the embodiment.
Figure 4:
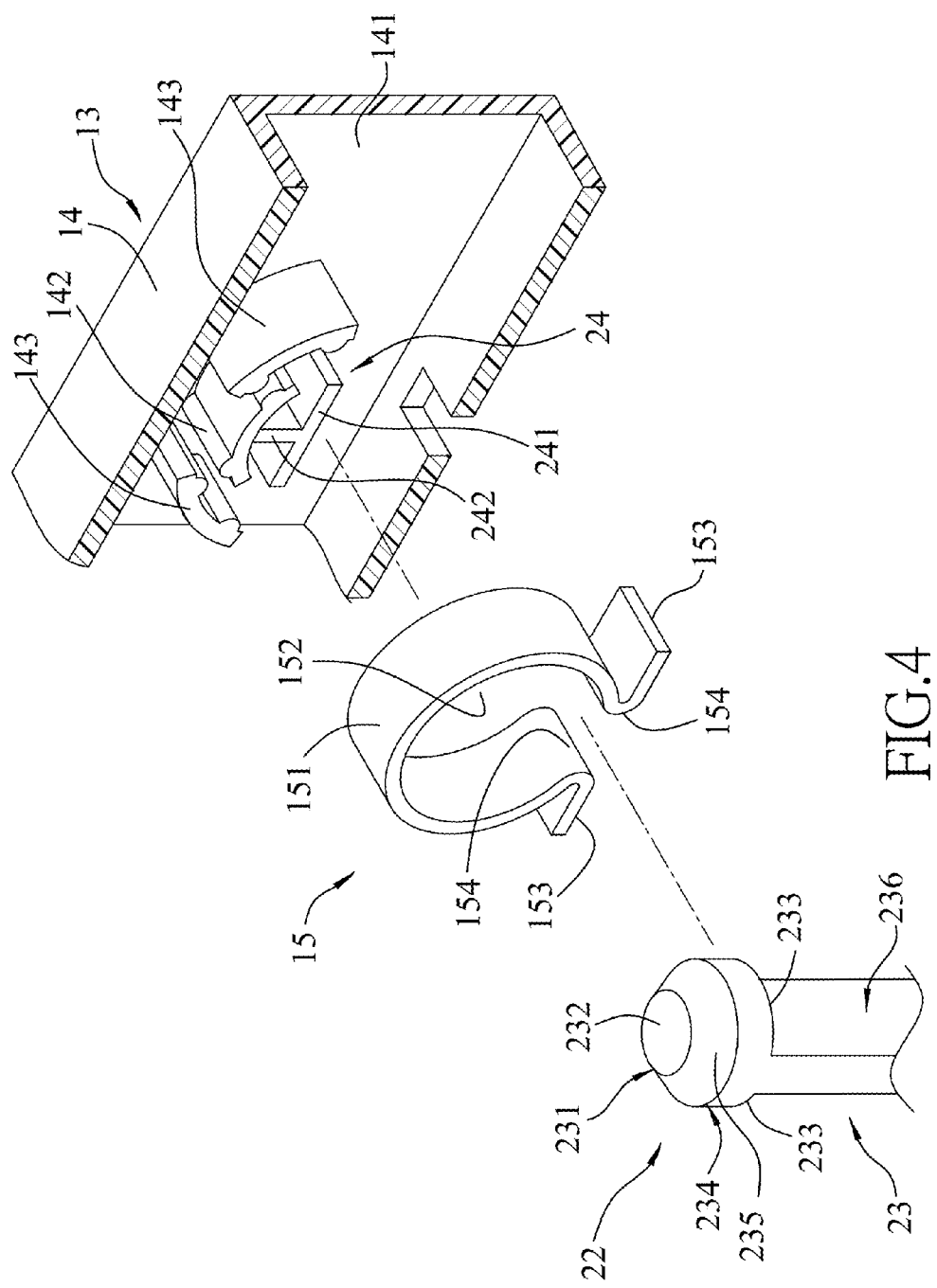
FIG. 4 is a fragmentary exploded view of the structural arrangement of the bar unit and the transmission unit of the embodiment.

Referring to FIGS. 2 to 4, the embodiment of a sunshade assembly according to the present invention is illustrated. The sunshade assembly is used for installation on a window frame 51 of a vehicle door 5. The vehicle door 5 has a vehicle window 6 mounted in the window frame 51. The window frame 51 has a top 511 disposed above the vehicle window 6. The sunshade assembly is mounted to cover an opening defined by the window frame 51 in a non-limiting manner. In actual implementation, the sunshade assembly may be mounted at some other places in the vehicle. Since the feature of this invention does not reside in the vehicle door 5, details of the same are omitted herein for the sake of brevity. In this embodiment, the sunshade assembly includes a sunshade mechanism 1 and a stretching mechanism 2 connected to the sunshade mechanism 1.

The sunshade mechanism 1 includes a casing 11, a curtain 12 and a bar unit 13. The casing 11 has a top opening 111. The curtain 12 is disposed in the casing 11 in a resiliently windable manner and has an end portion 121 exposed out of the top opening 111. The bar unit 13 is connected to the curtain 12 and has a bar 14 and a pivot connection member 15. The bar 14 is mounted on the end portion 121 of the curtain 12. The pivot connection member 15 is disposed inside the bar 14 and has an accommodating space 152. In actual implementation, the sunshade assembly further includes a winding shaft 19 for the curtain 12 to wind therearound and a resilient member (not shown) that enables the winding shaft 19 to roll in a direction for winding up the curtain 12. The resilient member has an end fixed in the casing 11 and another end connected to and rotatable together with the winding shaft 19. When the winding shaft 19 is rotated, the resilient member provides a restoring force to enable the winding shaft 19 to rotate back. In other words, when the winding shaft 19 is not affected by an external force, the restoring force of the resilient member enables the winding shaft 19 to wind up the curtain 12 so that the curtain 12 is received in the casing 11. Preferably, a non-limiting example of the resilient member is a torsion spring.

The bar 14 has a mounting space 141 that receives the pivot connection member 15. The bar 14 may further have at least one inner securing portion 142 and at least one outer securing portion 143 disposed in the mounting space 141. In this embodiment, the bar 14 has one inner securing portion 142 and a plurality of the outer securing portions 143 disposed in the mounting space 141 in an angularly spaced-apart manner. The inner securing portion 142 and the outer securing portions 143 cooperatively clamp the pivot connection member 15. In one embodiment, the bar 14 may have only one inner securing portion 142 and only one outer securing portion 143 which are sufficient for cooperatively clamping the pivot connection member 15 therebetween. Of course, the number of the inner securing portion 142 and the number of the outer securing portion 143 may be varied and adjusted according to the actual application.

The pivot connection member 15 has a resilient open ring 151 that surrounds the accommodating space 152, and two clamping elements 153 that are respectively connected to two opposite ring ends of the resilient open ring 151. In this embodiment, the pivot connection member 15 is a spring steel. The resilient open ring 151 has a C-shaped cross section and is clamped slidably by the inner securing portion 142 and the outer securing portions 143 in the mounting space 141. In such arrangement, the inner securing portion 142 contacts slidably an inner surface of the open ring 151 and the outer securing portions 143 contact slidably an outer surface of the open ring 151. It should be noted that the bar 14 and the pivot connection member 15 may be connected with each other in other arrangements and manners.

In this embodiment, the stretching mechanism 2 is connected to the sunshade mechanism 1 and is capable of driving the bar unit 13 to move upward or downward relative to the window frame 51, such that the curtain 12 is able to be stretched or wound up. The stretching mechanism 2 includes a drive unit 21 that is disposed below the casing 11 and a transmission unit 22 that is connected to the drive unit 21.

In this embodiment, the sunshade assembly according to the present invention is electrically driven. The transmission unit 22 and the bar unit 13 are driven by a servomotor that serves as the drive unit 21 to stretch or wind up the curtain 12. Alternatively, the sunshade assembly is mechanically driven, in which case the transmission unit 22 and the bar unit 13 are driven by a resilient force that is provided by a resilient mechanical structure that serves as the drive unit 21 to stretch or wind up the curtain 12.

In this embodiment, the transmission unit 22 has a transmission rod 23 that is driven by the drive unit 21 to move upward or downward and that is connected to the bar unit 13, and an abutment member 24 that is received in the mounting space 141 of the bar 14 and that is surrounded by the pivot connection member 15.

The transmission rod 23 has a head portion 231 that extends movably into the accommodating space 152 to abut against the abutment member 24, and a rod portion 236 that is connected to the head portion 231 and engages the pivot connection member 15.

The head portion 231 has an abutting surface 232 that abuts against the abutment member 24 and that is distal from the rod portion 236, and an engagement surface 233 that is proximate to the rod portion 236. In this embodiment, there are two of the engagement surfaces 233 opposite to the abutting surface 232. The head portion 231 further has a connection segment 234 that is formed between the abutting surface 232 and the engagement surfaces 233 and that has a frustoconical surface 235 diverging from the abutting surface 232 towards the engagement surfaces 233.

Specifically, the frustoconical surface 235 is able to push the clamping elements 153 away from each other when the head portion 231 is passed through the clamping elements 153 to be placed in the accommodating space 152. When the transmission rod 23 is moved downward, the engagement surfaces 233 of the head portion 231 engage and push downward a part of the open ring 151 proximate to the clamping elements 153 so that the bar unit 13 is moved downward and the head portion 231 is prevented from disengaging from the accommodating space 152. In other embodiments, the number and the shape of the engagement surfaces 233 may vary.

The rod portion 236 extends downward from the head portion 231 and out of the accommodating space 152 to be connected to the drive unit 21. In such arrangement, the rod portion 236 is resiliently engaged with and clamped by the clamping elements 153. Preferably, the clamping elements 153 are formed as bent parts 154 that extend toward each other respectively from the ring ends of the resilient open ring 151 to abut against the rod portion 236 and that are bent away from each other from the rod portion 236. Accordingly, the rod portion 236 extends out of the accommodating space 152 through the clamping elements 153, and part of the rod portion 236 in the accommodating space 152 is connected to the head portion 231.

The abutment member 24 of the transmission unit 22 has a cross-section with an inverted T-shape, and includes a substantially horizontal plate portion 241 and an upstanding portion 242. In this embodiment, the plate portion 241 abuts against the head portion 231 of the transmission rod 23. The upstanding portion 242 extends upwardly from the plate portion 241 to abut against the inner securing portion 142 of the bar 14. As shown in FIG. 3, the width (L1) of the plate portion 241 is larger than the width (L2) of the upstanding portion 242.

Figure 5:
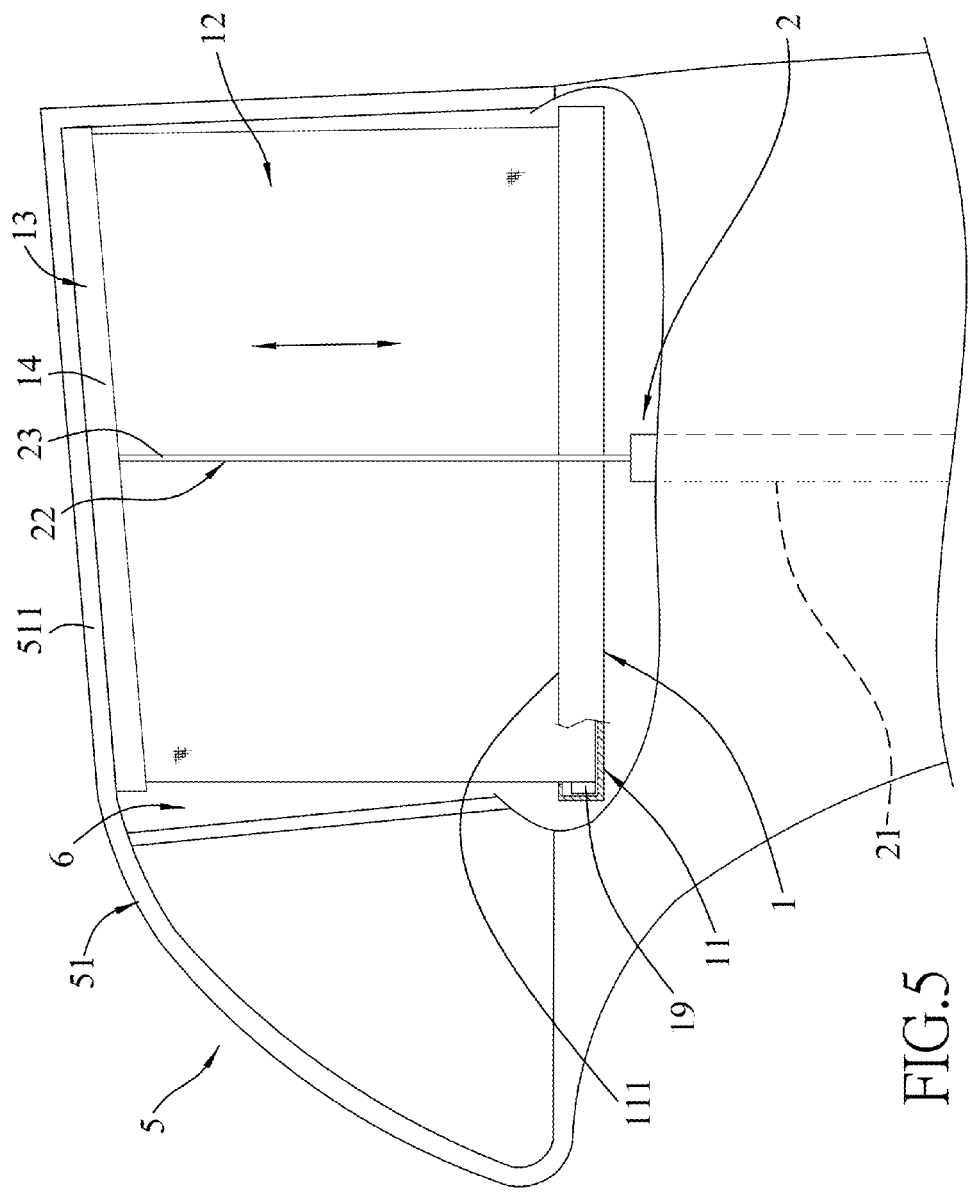
FIG. 5 is a schematic view similar to FIG. 2, illustrating the curtain of the embodiment in a stretched state.

In actual use, the stretching mechanism 2 enables the curtain 12 to be wound up or stretched relative to the casing 11 (as shown in FIGS. 2 and 5). When the drive unit 21 of the stretching mechanism 2 drives the transmission rod 23 to move upward, the head portion 231 pushes upward the abutment member 24 to move upward the bar 14 and to thereby stretch the curtain 12. In such a manner, the bar unit 13 is moved upwardly together with the end portion 121 of the curtain 12 and away from the casing 11, and thus, the curtain 12 is stretched as shown in FIG. 5.

With reference back to FIGS. 3, 5 and 6, when the bar unit 13 moves upward and abuts against the top 511 of the window frame 51, the bar unit 13 pivots relative to the transmission unit 22 due to the cooperation between the transmission unit 22, which is divided into the transmission rod 23 and the abutment member 24, and the pivot connection member 15, which has the accommodating space 152 to receive movably the head portion 231 and the abutment member 24. Such an arrangement permits the bar unit 13 to move pivotally relative to the transmission unit 22. Because the width (L1) of the plate portion 241 is larger than the width (L2) of the upstanding portion 242, a contact surface area between the abutment member 24 and the inner securing portion 142 is reduced and the mobility of the inner securing portion 142 relative to the abutment member 24 may be increased.

Specifically, since the clamping elements 153 clamp the rod portion 236 using the bent parts 154 of the clamping elements 153 that protrude toward and abut against the rod portion 236, the degree of mobility between the clamping elements 153 and the rod portion 236 can be increased. Moreover, since the clamping elements 153 are resiliently movable toward or away from each other, when the bar 14 pivots relative to the transmission rod 23, the rod portion 236 pushes one of the clamping elements 153 away from the other one of the clamping elements 153 and is therefore unclamped by the clamping elements 153. As a result, the bar unit 13 can pivot relative to the transmission unit 22 with a relatively high level of mobility.

Since the bar unit 13 can pivotally move relative to the transmission unit 22, the sunshade assembly of the present invention is suitable for installation on window frames regardless of the shape thereof. When the drive unit 21 drives the transmission rod 23 to move downward from the top 511 of the window frame 51, the head portion 231 brings the bar 14 to move downward to the casing 11 so that the curtain 12 is wound up in the casing 11. In other words, during the downward movement of the transmission rod 23, the engagement surfaces 233 of the head portion 231 engage and push downward a part of the open ring 151 proximate to the clamping elements 153 so that the transmission rod 23 can drive the bar 14 and the pivot connection member 15 of the bar unit 13 to move downward together to the casing 11.

Accordingly, when the bar 14 abuts against the top 511 of the window frame 51, the bar unit 13 is movable pivotally relative to the transmission unit 22 such that the curtain 12 shields the window 6 without bending the transmission rod 23. As such, during use, the transmission rod 23 is avoided from being making frequent bending, which can impair or reduce the structural strength of the transmission unit 22.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A sunshade assembly for installation on a window frame, comprising:

a sunshade mechanism including
a casing that has a top opening,
a curtain that is disposed in said casing in a resiliently windable manner and that has an end portion exposed out of said top opening, and
a bar unit that is connected to said curtain and that has a bar and a pivot connection member, said bar being mounted on said end portion of said curtain, said pivot connection member being disposed inside said bar and having an accommodating space; and
a stretching mechanism connected to said sunshade mechanism and including
a drive unit that is disposed below said casing,
a transmission unit that is connected to said drive unit, said transmission unit having a transmission rod that is driven by said drive unit to move upward or downward and that is connected to said bar unit, and an abutment member that is received in said accommodating space and that is surrounded by said pivot connection member, said transmission rod having a head portion that extends movably into said accommodating space to abut against said abutment member, and a rod portion that is connected to said head portion and that engages said pivot connection member;
wherein, when said drive unit drives said transmission rod to move upward, said head portion pushes upward said abutment member to move upward said bar and to thereby stretch said curtain;
wherein said bar is pivotally movable relative to said transmission rod and about said pivot connection member so that said transmission rod is not bent when said bar abuts against a top of the window frame;
wherein, when said drive unit drives said transmission rod to move downward, said head portion brings said bar to move downward so that said curtain is wound up.

2. The sunshade assembly as claimed in claim 1, wherein:
said rod portion extends downward from said head portion and out of said accommodating space to be connected to said drive unit;
said pivot connection member has a resilient open ring surrounding said accommodating space, and two clamping elements respectively connected to two opposite ring ends of said resilient open ring to resiliently engage and clamp said rod portion;
wherein, when said bar pivots relative to said transmission rod, said rod portion pushes one of said clamping elements away from the other one of said clamping elements and is therefore unclamped by said clamping elements.

3. The sunshade assembly as claimed in claim 2, wherein said clamping elements are formed as bent parts that extend toward each other respectively from said ring ends of said resilient open ring to abut against said rod portion and that are bent away from each other from said rod portion.

4. The sunshade assembly as claimed in claim 2, wherein:
said rod portion extends out of said accommodating space through said clamping elements;
said head portion has an abutting surface that abuts against said abutment member of said transmission unit and that is distal from said rod portion, and an engagement surface that is proximate to said rod portion; and
when said transmission rod is moved downward, said engagement surface of said head portion engages and pushes downward a part of said open ring proximate to said clamping elements so that said bar unit is moved downward.

5. The sunshade assembly as claimed in claim 4, wherein said head portion further has a connection segment formed between said abutting surface and said engagement surface and having a frustoconical surface that diverges from said abutting surface towards said engagement surface, said frustoconical surface being able to push said clamping elements away from each other when said head portion is passed through said clamping elements to be placed in said accommodating space.

6. The sunshade assembly as claimed in claim 2, wherein said bar has a mounting space that receives said pivot connection member and said abutment member of said transmission unit, said bar further having at least one inner securing portion and at least one outer securing portion that are disposed in said mounting space, said open ring being clamped slidably by said at least one inner securing portion and said at least one outer securing portion in said mounting space, said at least one inner securing portion contacting slildably an inner surface of said open ring, said at least one outer securing portion contacting slidably an outer surface of said open ring.

7. The sunshade assembly as claimed in claim 6, wherein said abutment member of said transmission unit has a cross-section with an inverted-T shape, and includes a substantially horizontal plate portion and an upstanding portion, said plate portion abutting against said head portion of said transmission rod, said upstanding portion extending upwardly from said plate portion to said at least one inner securing portion of said bar.

8. sunshade assembly as claimed in claim 6, wherein said bar has a plurality of said outer securing portions disposed in said mounting space in an angularly spaced-apart manner.

\* \* \* \* \*